US006846995B2

United States Patent
Bonn

(10) Patent No.: US 6,846,995 B2
(45) Date of Patent: Jan. 25, 2005

(54) SWITCHING DEVICE FOR A VEHICLE HORN

(75) Inventor: Helmut Bonn, Haibach (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 10/651,495

(22) Filed: Aug. 29, 2003

(65) Prior Publication Data

US 2004/0099517 A1 May 27, 2004

(30) Foreign Application Priority Data

Aug. 30, 2002 (DE) .......................................... 102 41 048

(51) Int. Cl.$^7$ ............................ H01H 9/00; B60R 21/16
(52) U.S. Cl. ..................... 200/61.54; 180/333; 280/731
(58) Field of Search ........................... 200/61.54–61.57, 200/334; 74/552, 484 R–526; 180/315–335; 280/731

(56) References Cited

U.S. PATENT DOCUMENTS

| 4,939,951 | A | 7/1990 | Kaneko |
|---|---|---|---|
| 5,650,600 | A | 7/1997 | Walters |
| 5,971,429 | A | 10/1999 | Bramberger et al. |
| 6,504,120 | B2 * | 1/2003 | Hsu ........................... 200/344 |

FOREIGN PATENT DOCUMENTS

| DE | 197 32 022 A1 | 5/1998 |
|---|---|---|
| DE | 100 25 417 A1 | 11/2000 |

* cited by examiner

Primary Examiner—James R. Scott
(74) Attorney, Agent, or Firm—Fitch, Even, Tabin & Flannery

(57) ABSTRACT

The invention relates to a switching device for a vehicle horn of a vehicle having an actuation element by means of which the vehicle horn is triggered when pressure is applied by an operator. In order to make the switching device particularly user-friendly, the invention provides for the actuation element to be mounted on a pantograph device in such a way that the actuation element can move exclusively in a direction which is predefined by the pantograph device.

25 Claims, 5 Drawing Sheets

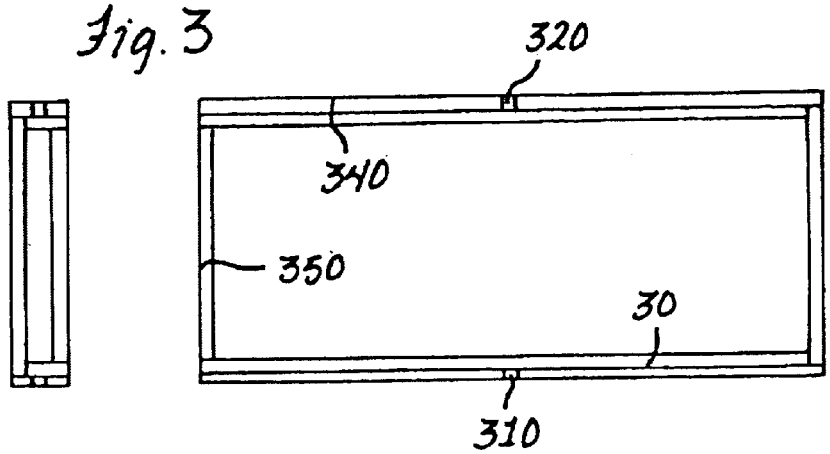
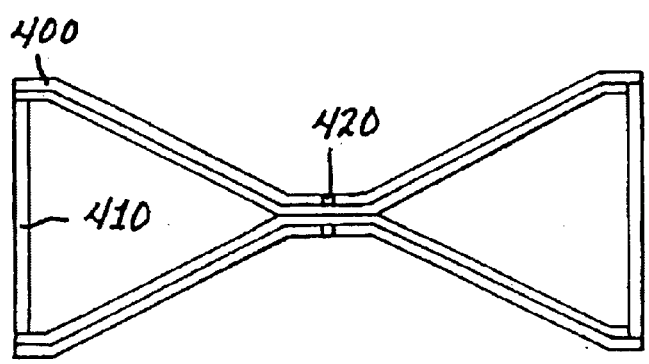
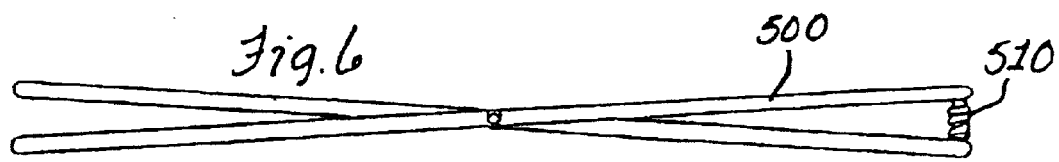
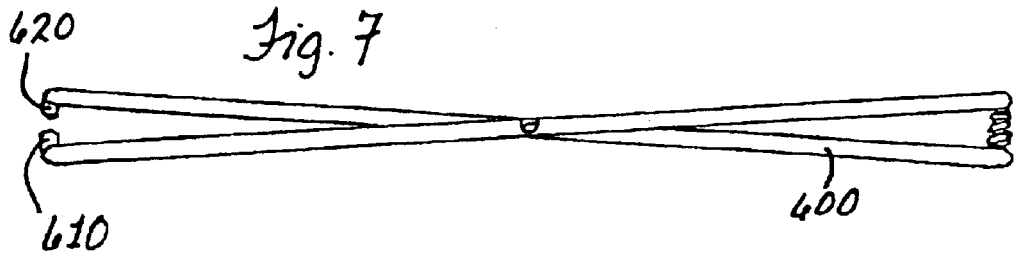

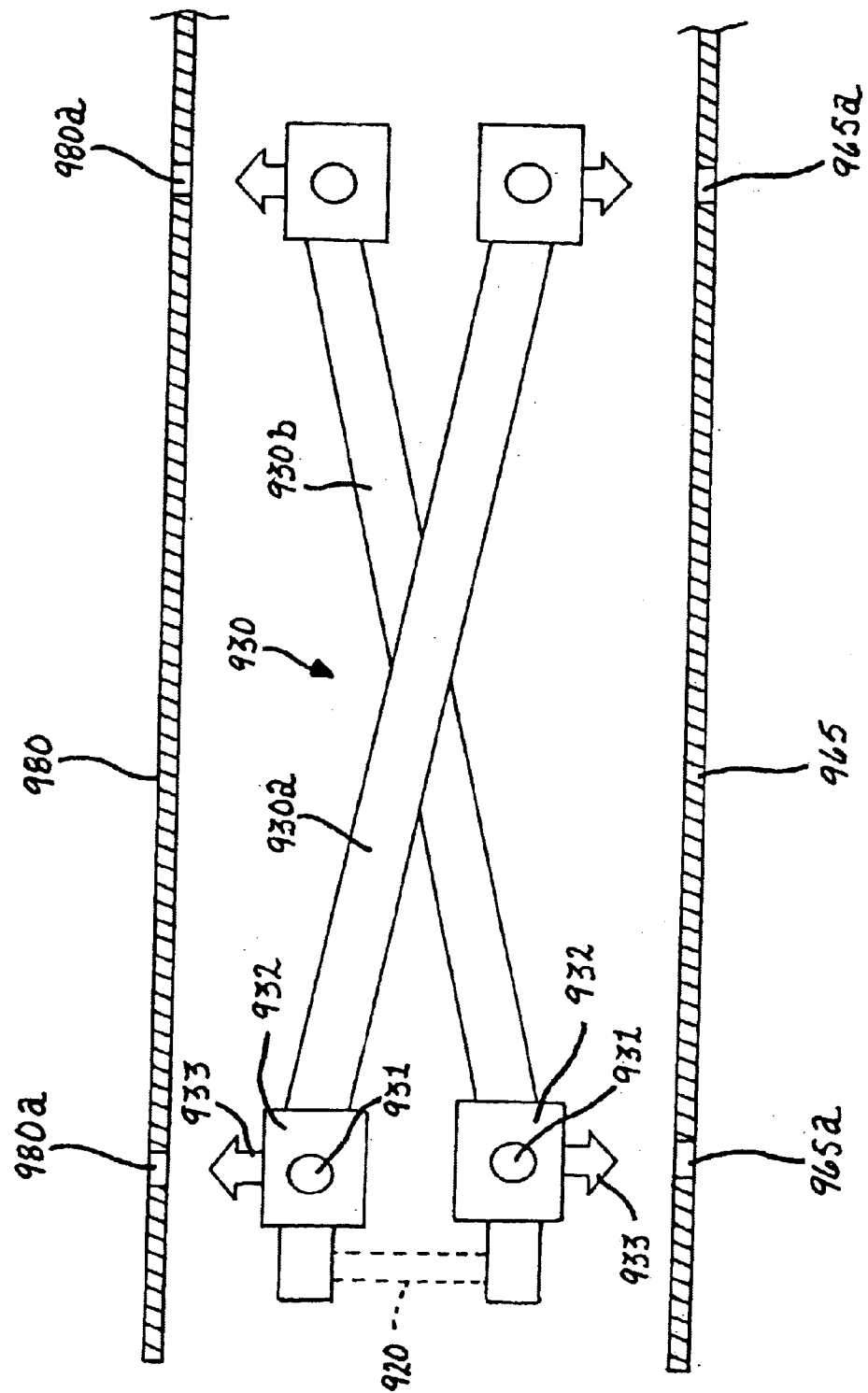

SWITCHING DEVICE FOR A VEHICLE HORN

INCORPORATION BY REFERENCE

Priority is claimed to German Patent Application No. 102 41 048.8-42 filed on Aug. 30, 2002, which also is incorporated herein by reference.

FIELD OF THE INVENTION

The invention relates to a switching device for a vehicle horn with an actuation element that triggers the horn when pressure is applied by an operator.

BACKGROUND OF THE INVENTION

Such a switching device is known from the German laid-open application 197 32 022 A1. In the previously known switching device, a cover cap of an airbag which is integrated into the steering device or steering wheel structure of a vehicle forms an actuation device for the vehicle horn. The cover cap of the airbag is attached in a sprung fashion to the steering wheel structure via two spring elements. In order to guide the cover cap laterally with respect to the steering wheel structure, two pins which are inserted into drilled holes in the steering wheel structure which match them are provided in the cover cap. In each case an electrical switching contact is provided on the cover cap and on the steering wheel structure; by pressing on the spring-mounted cover cap, the two switching contacts are closed and the horn is triggered or activated.

SUMMARY OF THE INVENTION

The invention is based on the object of specifying a switching device for a vehicle horn which can be operated in a particularly user-friendly way. For example, it is considered user-friendly if the horn is always triggered with the same actuation force or actuation pressure.

This object is achieved according to the invention by means of mounting an actuation element on a pantograph device so that the actuation element can move exclusively in a direction which is predefined by the pantograph device. Advantageous refinements of the switching device according to the invention are described hereinafter.

Accordingly, there is provision for the switching device to have an actuation element which is mounted on a pantograph device. The actuation element is provided with bearings which are such that the actuation element can move exclusively in a direction which is predefined by the pantograph device. An essential advantage of the switching device according to the invention is that when pressure is applied the actuation element cannot execute a "tilting movement". Owing to the precisely predefined direction, the actuation path which is required to trigger the vehicle horn and the required actuation force are always of the same size, specifically irrespective of whether the actuation element is activated, or force is applied to it, in its centre or at its edge region. In contrast, for example, to the previously known switching devices without a pantograph device, with the switching device according to the invention it is therefore impossible that the force for actuating the horn or the necessary actuation travel when the actuation element is depressed depends on the location at which the actuation element is pressed on its surface. Actuation elements for switching devices for vehicle horns are in fact generally very large in area in order to ensure that in an emergency situation a driver of a vehicle can readily trigger the vehicle horn by pressing on the external surface of the actuation element. If, as is the case for example in the previously known switching device, the actuation element is spring-mounted, it may be the case that when the actuation element is activated in the central region a relatively large force is necessary to trigger the vehicle horn because in fact all the spring elements of the switching device have to be compressed, while on the other hand if the actuation element is depressed in its edge region it is possible, under certain circumstances, that exclusively the spring force of a single spring device will have to be overcome, which leads to a situation in which the horn is triggered with a relatively small expenditure of force. As a result, with switching devices of the previously known art without a pantograph device it is possible for the expenditure of force which is necessary to trigger the horn to depend on the location at which the horn is depressed; this is avoided with the switching device according to the invention.

The pantograph device in the switching device according to the invention can be formed particularly easily, and thus advantageously, with at least two pantograph elements which are connected by means of at least one rotary bearing.

In order to permit the pantograph device to be installed particularly easily in the switching device of the vehicle, it is considered advantageous if the pantograph elements are of mirror-symmetrical design. The at least one rotary bearing is then to be advantageously arranged in the region of the mirror axis of the pantograph elements.

With respect to the integration of the pantograph device in the switching device, it is considered advantageous if the one end of each of the pantograph elements is in contact with the actuation element, and the respective other end, opposite the one end, is in contact with a basic unit of the switching device, the two pantograph elements having the at least one rotary bearing in the central region between their two ends.

The pantograph device can be advantageously attached by centering the pantograph device on four support points in guide bearings in such a way that when they are actuated the pantograph elements can move freely in a floating fashion over the four support points.

In order to support the pantograph elements in the guide bearings, it is considered advantageous if the pantograph elements are mounted in the bearing region on plastic having good surface slip because plastic having good surface slip has a particularly low coefficient of friction.

It is also considered advantageous if the actuation element of the switching device is spring-mounted; this can be advantageously achieved in particular by virtue of the fact that the pantograph device is prestressed with a pressure spring or flat spring whose spring force has to be overcome when the actuation element is actuated.

It is also considered advantageous if the basic unit of the switching device is formed by the steering device or the steering wheel structure of the vehicle.

If the switching device has an electrical switching element which is closed by the actuation element, it is considered advantageous if the pantograph element is electrically insulated, and at least one electrical switching contact of the switching element is arranged on the pantograph device.

The switching device according to the invention can be integrated particularly easily and advantageously in a steering wheel of a vehicle by virtue of the fact that the actuation element of the switching device is formed by a cover cap of the steering wheel and the pantograph device is arranged between the cover cap and the steering device. If the steering wheel has an airbag device integrated into it, it is considered advantageous if the actuation element is formed by means of a cover cap of the airbag device, and the pantograph device is arranged between the airbag device and the steering wheel structure.

Furthermore, one of the switching contacts can also be attached to the steering device, and its corresponding contact to an airbag of the vehicle.

Furthermore, it is considered advantageous if the pantograph device is embodied as a single, self-bearing prefabricated structural unit which is added to the steering device or to an airbag unit while the switching device is being mounted. Alternatively, the pantograph device can advantageously also be mounted in the switching device as individual parts in such a way that its stability is formed by the steering device or the airbag unit.

BRIEF DESCRIPTION OF THE DRAWINGS

FIG. 3 shows the pantograph device according to the exemplary embodiment in accordance with FIG. 1 in detail;

FIG. 4 shows a second exemplary embodiment of a pantograph device;

FIG. 5 shows an exemplary embodiment of a rotary bearing for a pantograph device;

FIG. 6 shows an exemplary embodiment of a pantograph device with a spring device;

FIG. 7 shows an exemplary embodiment of a pantograph device with a spring device and with electrical contacts;

FIG. 11 shows the pantograph device of FIG. 10 in detail.

DETAILED DESCRIPTION OF THE PREFERRED EMBODIMENTS

Figure 1:
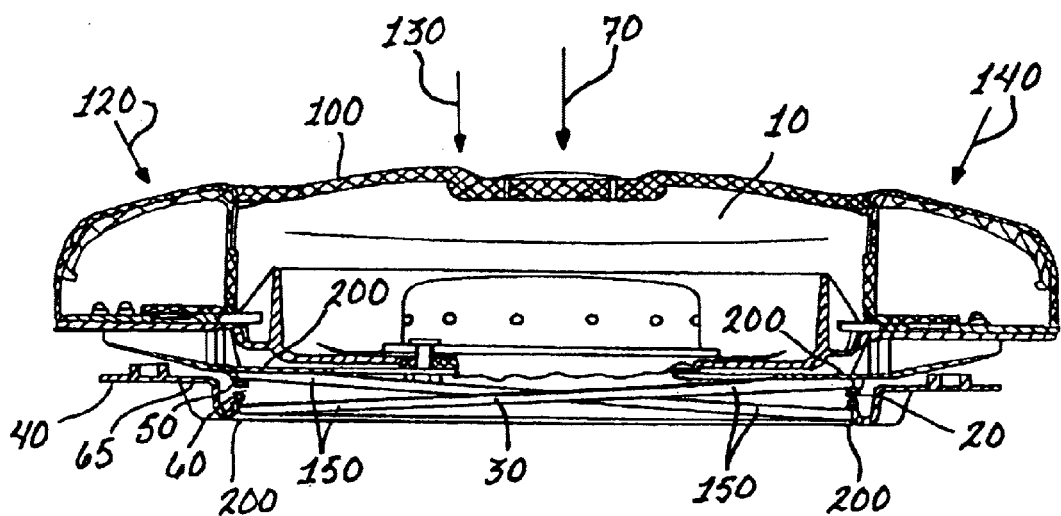
FIG. 1 shows an exemplary embodiment of a switching device according to the invention in a side view.

FIG. 1 shows an airbag unit 10 which is attached to a steering device 40 via a spring device 20 and a pantograph device 30. A first switching contact 50, which is connected to a second switching contact 60 on a contact carrier plate 65 of the steering device 40 and can be brought into electrical contact with it, is attached to the airbag unit 10. The second switching contact 60 therefore acts as a corresponding contact and is arranged on the steering device 40. Specifically, an electrical connection is formed between the first switching contact 50 and the second switching contact 60 when the airbag unit 10 is depressed in the direction of the steering device 40 counter to the spring force of the spring device 20.

The movement of the airbag unit 10 in the direction of the steering device 40 is defined here by means of the pantograph device 30. The pantograph device 30 has the effect specifically of enabling the airbag unit 10 to be moved exclusively perpendicularly, i.e. in the direction predefined by the arrow 70—downwards. It is therefore not possible to tilt the airbag unit 10, specifically irrespective of how the cover cap 100 of the airbag unit 10 is depressed.

This is clearly illustrated by means of the arrows 120, 130 and 140 in FIG. 1: irrespective of the location at which pressure is exerted on the airbag 10 and the direction of force with which pressure is exerted on the airbag 10, said airbag moves in the direction 70 which is predefined by the pantograph device 30. In the exemplary embodiment according to FIG. 1, the airbag unit 10 can therefore only move in parallel with the direction predefined by the arrow 70.

Furthermore, FIG. 1 shows that the ends 150 of the pantograph elements of the pantograph device 30 are mounted in guide bearings 200 which are preferably formed by means of plastic having good surface slip. These plastic bearings permit low-friction movement of the pantograph device 30.

Figure 2:
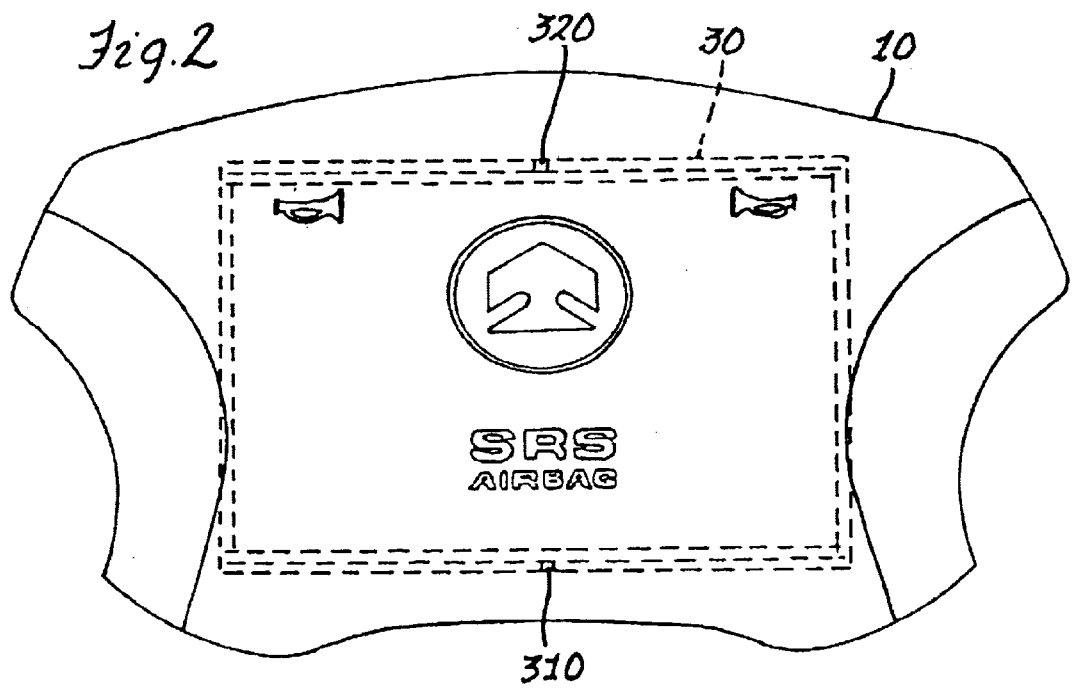
FIG. 2 shows the airbag unit of the exemplary embodiment according to FIG. 1 in a plan view.

FIG. 2 shows the airbag unit 10 according to FIG. 1 in a plan view. It is apparent that the airbag unit 10 is mounted on the pantograph device 30. The pantograph device 30 is illustrated by dashed lines in FIG. 2 and formed by means of two rectangular frames which are connected to one another by means of two rotary bearings 310 and 320.

FIG. 3 shows the pantograph device according to the exemplary embodiment in accordance with FIGS. 1 and 2, once more in detail. It is possible to see the pantograph device 30 with the two rotary bearings 310 and 320 which connect two U-shaped frame parts 340 and 350 to one another. The two U-shaped frame parts form the pantograph elements of the pantograph device and are oriented in opposite directions, the smaller frame part 350 being partly surrounded by the larger frame part 340.

FIG. 4 shows a second exemplary embodiment of a pantograph device for the switching device according to the invention. It is possible to see an external pantograph element 400 which surrounds an internal pantograph element 410 and is connected to it via a single rotary bearing 420.

FIG. 5 shows in detail how the rotary bearing 420 can be configured in detail in accordance with FIG. 4, or the two rotary bearings 310 and 320 in accordance with FIG. 3.

FIG. 6 shows a pantograph device 500 with a spring device 510 which is attached to the external end of two pantograph elements of the pantograph device. When the pantograph device 500 in accordance with FIG. 6 is used in the exemplary embodiment in accordance with FIG. 1, the pantograph device 500 would not only replace the pantograph device 30 but also the spring device 20.

FIG. 7 shows a pantograph device 600 which is equipped with a spring device 510 as well as with two electrical switching contact 610 and 620. The horn of the vehicle can be electrically triggered using the two electrical switching contacts 610 and 620. When the pantograph device 600 according to FIG. 7 is used in the exemplary embodiment in accordance with FIG. 1, the pantograph device 600 would not only replace the pantograph device 30 but also the spring device 20 and the switching contacts 50 and 60.

Figure 8:
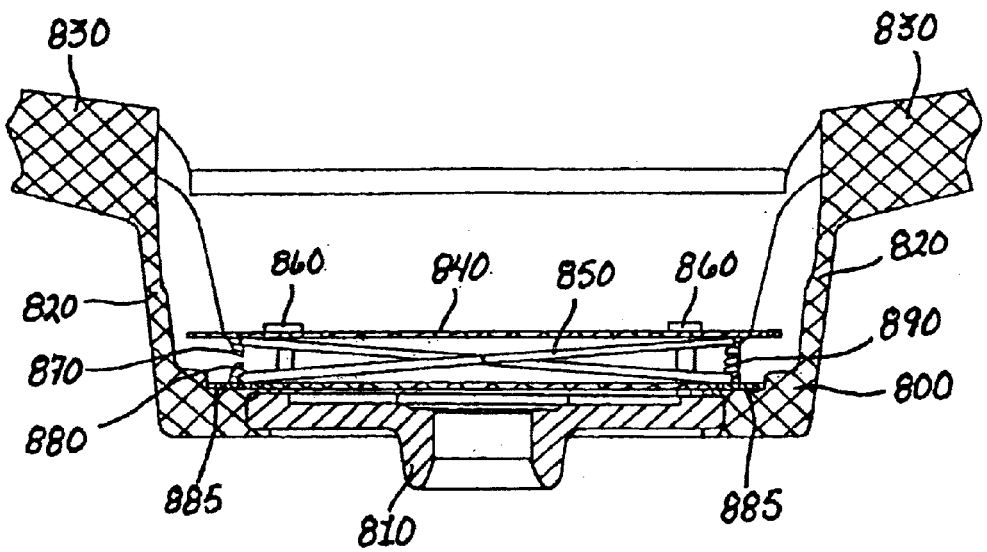
FIG. 8 shows a further exemplary embodiment of a switching device according to the invention in a side view.
Figure 9:
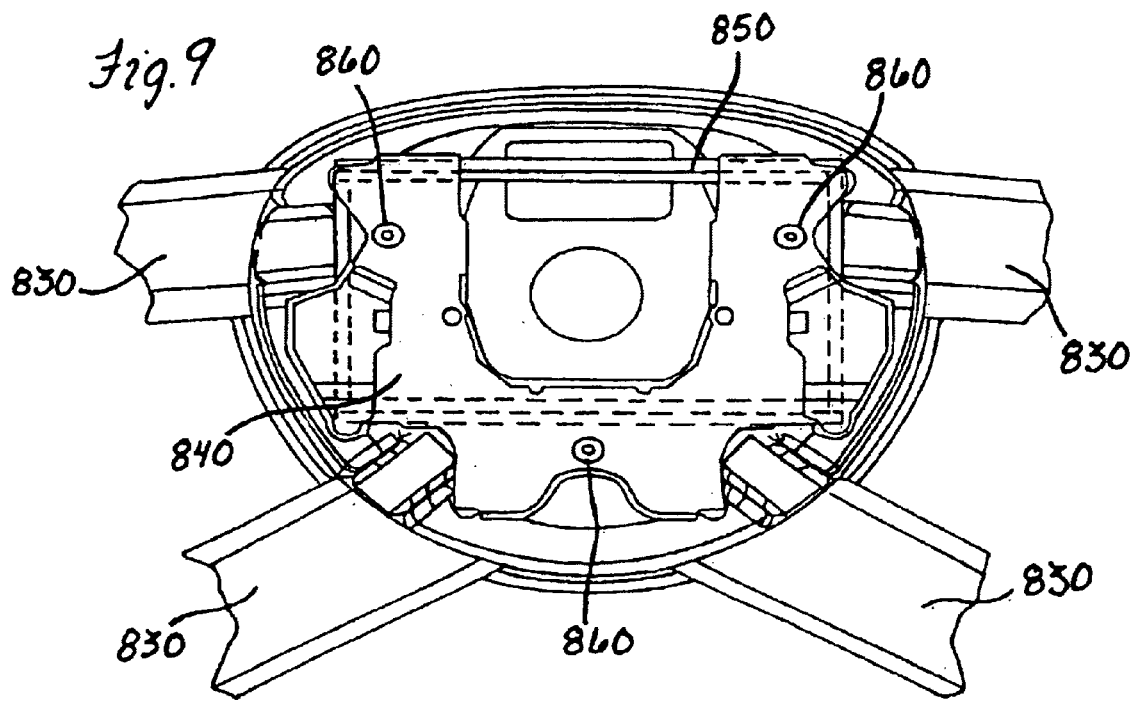
FIG. 9 shows the further exemplary embodiment according to FIG. 8 in a plan view.

FIGS. 8 and 9 show a further exemplary embodiment of a switching device according to the invention. The further exemplary embodiment according to FIGS. 8 and 9 differs from the first exemplary embodiment according to FIGS. 1 and 2 in that the pantograph device is integrated in the "steering wheel" between contact plates (cover plate and contact carrier plate), whereas in the exemplary embodiment according to FIGS. 1 and 2 it is arranged between the airbag 10 and the contact carrier plate 65 of the steering wheel 40.

FIG. 8 shows a steering wheel 800 with a steering wheel hub 810, a body 820 and steering wheel spokes 830. A cover plate 840 rests on a pantograph device 850 and is attached to the steering wheel 800 by means of collar screws 860. An electrical contact 870, which interacts with a corresponding contact 880 on a contact carrier plate 885, is arranged at the lower part of the cover plate.

In addition, a spring device 890 which exerts a spring force on the pantograph device 850 is shown. In addition, or instead, the spring force can also be generated by means of helical springs which are attached to the screw collars 860. This is not illustrated in FIG. 8 for the sake of clarity.

FIG. 9 shows the exemplary embodiment according to FIG. 8 in a plan view. It is possible to see the pantograph device 850 which is covered by the cover plate 840. The cover plate 840 is screwed to the steering wheel 800 via three collar screws 860. Furthermore, FIG. 9 shows the steering wheel spokes 830.

Figure 10:
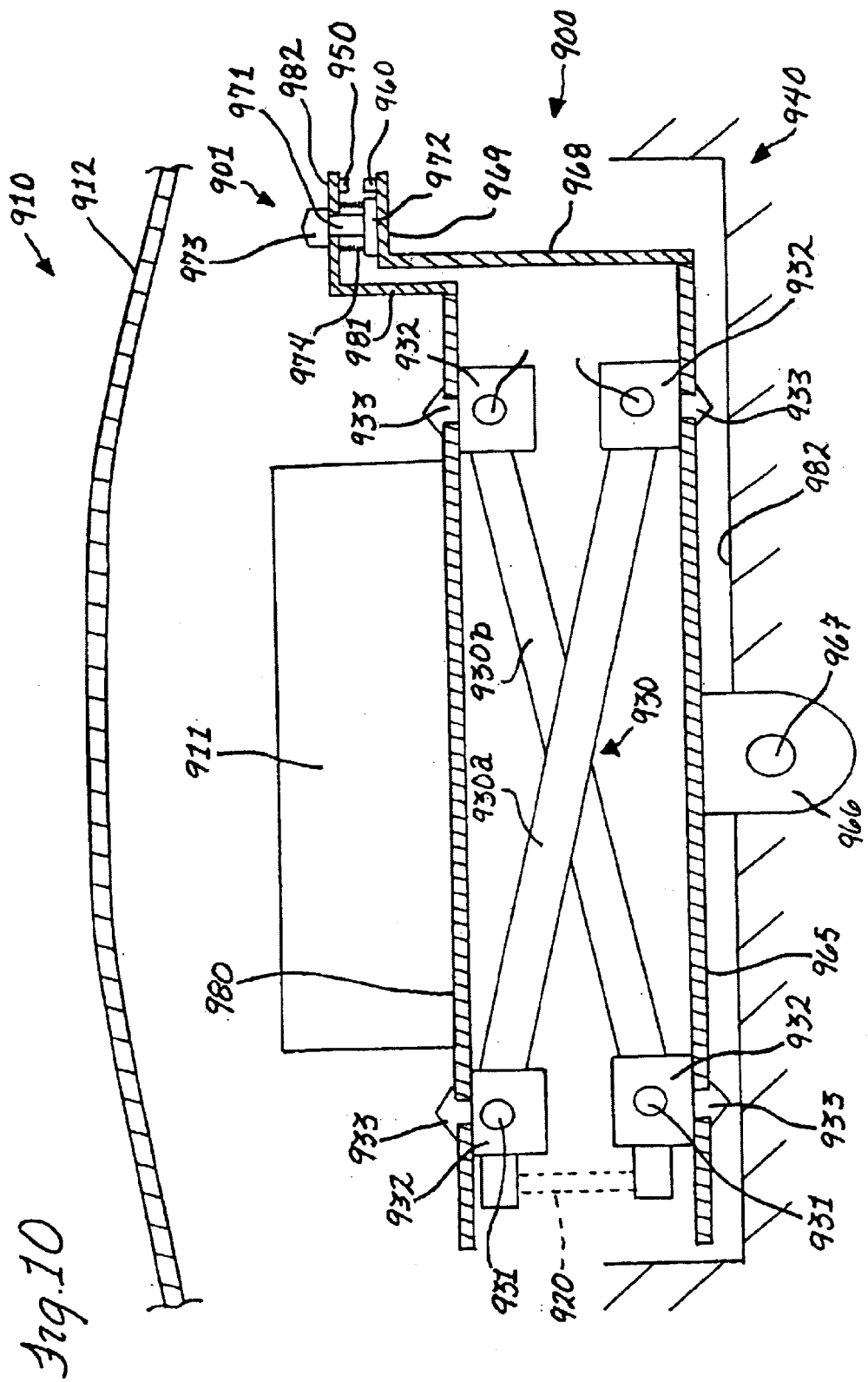
FIG. 10 shows a further embodiment of a switching device according to the invention in a side view.

Further, another representative embodiment of the present invention comprising a switching device 901, and airbag unit 910 and a steering wheel 900 is described in detail in reference to FIGS. 10 and 11. According to this embodiment, the airbag unit 910 is provided on the cover plate 980. While the airbag unit 910 includes a cover cap 912, an inflator 911 and an airbag inflated by the inflator 911, only the cover cap 912 and the inflator 911 are shown in FIG. 10 and the airbag itself is not particularly shown for the sake of convenience.

The cover plate 980 (also referred to as "retainer") onto which the airbag unit 910 is mounted is connected to the carrier plate 965 (also referred to as "horn plate") by means of a pantograph device 930. In other words, the pantograph device 930 is disposed between the cover plate 980 and the carrier plate 965. The pantograph device 930 includes a pair of pantograph elements 930*a*, 930*b*. The pantograph elements 930*a*, 930*b* intersects to each other to form "X". The pantograph device 930 functions to keep the pressing force exerted onto the cover cap 912 as constant without respect to the cover cap region where the operator presses. In this respect, the pantograph device 930 serves as a stabilizer to equalize the pressing force of the operator and may embrace any types of pantograph structure that can stabilize the pressing force exerted onto the cover cap 912 even when the operator presses the cover cap 912 at different regions of the cover cap 912 to activate the vehicle horn.

FIG. 11 shows the pantograph device 930 to be fastened to the cover plate 980 and the carrier plate 965. Both ends of respective pantograph elements 930*a*, 930*b* include bearings 932 made of resin by means of pantograph rotation holder 931. Each of the pantograph elements 930*a*, 930*b* is allowed to relatively rotate with respect to the respective bearings 932 by way of the rotation holder 931. In this embodiment, a clip 933 made of resin is coupled to each bearing 932. Clips 933 can be inserted to clip insertions holes 980*a*, 965*a* provided respectively in the cover plate 980 and in the carrier plate 965 (see FIG. 10). Thus, each bearing 932 is fastened to the cover plate 980 and to the carrier plate 965 such that any unintended detachment of each bearing 932 from the cover plate 980 and the carrier plate 965 can be prevented. That is, clips 933 can be secured to the plates 980 and 965 only by pushing clips 933 into the clip insertion holes 980*a*, 965*a*, respectively. As a result, the pantograph device 930 can be easily connected to the cover plate 980 and to the carrier plate 965 in a one-touch or single step manner. Further, the pantograph device 930 may be easily detached from the plates 980, 965 by way of the detaching operation of the clip 933. Each of the bearings 932 and each of the clips 933 may be provided by utilizing any materials other than resin. For example, hard rubber or metal may preferably be utilized for the bearings 932 and for the clips 933. Further each clip 933 may be integrally manufactured together with the bearing 932. Otherwise, each clip 933 may be detachably or fixedly coupled to the bearing 932 after being manufactured. As well, each bearing 932 may be integrally manufactured together with the pantograph elements 930*a*, 930*b*. Otherwise, each bearing 932 may be detachably or fixedly coupled to the pantograph elements 930*a*, 930*b* after being manufactured.

Further, as shown in FIG. 10, a spring device 920 is provided between both ends of the pantograph element 930*a*, 930*b*. The spring device 920 exerts biasing force so as to move the pantograph elements 930*a*, 930*b* away from each other.

The cover plate 980 is connected to a moveable plate 982 via a connecting plate 981. Further, the carrier plate 965 is connected to a stationary plate 969 via a connecting plate 968. The movable plate 982 and the stationary plate 969 are disposed so as to face to each other. A guide bolt 971 is provided via an insulator 972 on the surface of the stationary plate 969 that faces to the movable plate 982. The guide bolt 971 penetrates the moveable plate 982. The guide bolt 971 includes a cover plate movement controlling device 973 on the opposite side of the moveable plate 982. The controlling device 973 has larger diameter than the diameter of the guide bolt 971 in order to prevent the moveable plate 982 from moving away from the stationary plate 969 beyond a predetermined distance. Further, a spring 974 is provided around the guide bolt 971 between the moveable plate 982 and the stationary plate 969. The spring 974 exerts biasing force so as to move the moveable plate 982 away from the stationary plate 969. As a result, the movable plate 982 is biased by the spring 974 to move away from the stationary plate 969, while the removing distance from the stationary plate 969 is controlled by means of the controlling device 973. When the operator moves the moveable plate 982 too close to the stationary plate 969 against the biasing force of the spring 974, the moveable plate 982 can be securely guided by the guide bolt 971 so as to be prevented from moving laterally according to FIG. 10.

Further, first switching contact 950 and second switching contact 960 are provided on the respective surface of the moveable plate 982 and the stationary plate 969 facing to each other so as to form a switch device 901. Switching contact 950, 960 are connected to each other when the moveable plate 982 closes to the stationary plate 969. As a result, the vehicle horn device can be activated.

A fastening plate 966 is provided on the bottom surface of the carrier plate 965. A fastening bolt 967 can be engaged with the fastening plate 966. By utilizing the fastening plate 966 and the fastening bolt 967, the carrier plate 965 can be detachably fastened to the steering wheel body 982 of the steering wheel 900.

According to this embodiment, the airbag unit 910, the cover plate 980, the pantograph device 930, the carrier plate 965 and the switching device 901 are integrally preassembled before being mounted to the steering wheel 900. At this stage, the pantograph device 930 can be easily coupled to the cover plate 980 and to the carrier plate 965 by utilizing the clip 933 in one-touched manner. Thus, the forming of the preassembled body including the airbag unit 910, the pantograph device 930 and the switching device 901 can be easily accomplished. Then, the preassembled body can be easily fastened to the steering wheel 900 by utilizing fastening plate 966 and the fastening bolt 967.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

List of Reference Numerals

10 Airbag unit
20 Spring device
30 Pantograph device
40 Steering device
50 First switching contact
60 Second switching contact
65 Contact carrier plate
70 Arrow
100 Cover cap
120, 130, 140 Arrows
150 Pantograph elements
200 Guide bearings
310, 320 Rotary bearings
340, 350 Frame parts
400 External pantograph element
410 Internal pantograph element
420 Rotary bearing
500 Pantograph device
510 Spring device
600 Pantograph device
610, 620 Electrical switching contacts
800 Steering wheel
810 Steering wheel hub
820 Body
830 Steering wheel spokes
840 Cover plate
850 Pantograph device
860 Collar screws
870 Electrical contact
880 Corresponding contact
885 Contact carrier plate
890 Spring device

What is claimed is:

1. Switching device for a vehicle horn with an actuation element which triggers the vehicle horn when pressure is applied by an operator, characterized in that
   the actuation element is mounted on a pantograph device such
   that the actuation element can move exclusively in a direction which is predefined by the pantograph device, and
   at least one moveable contact mounted on the pantograph device opposite of a countercontact.

2. Switching device according to claim 1, characterized in that the pantograph device has at least two pantograph elements which are connected by at least one rotary bearing.

3. Switching device according to claim 2, characterized in that the one end of each of the pantograph elements is in contact with the actuation element, and the respective other end, opposite the one end, is in contact with a basic unit of the switching device, the two pantograph elements having the at least one rotary bearing in the central region between their two ends.

4. Switching device according to claim 2, characterized in that the pantograph elements are formed by two U-shaped frame parts which are each connected on their two sides by a rotary bearing.

5. Switching device according to claim 1, characterized in that the pantograph device is centered on four support points in guide bearings and can move freely in a floating fashion over the support points during actuation.

6. Switching device according to claim 5, characterized in that the pantograph device is mounted in the region of the guide bearings on plastic having good surface slip.

7. Pantograph device according to claim 1, characterized in that the pantograph device is prestressed with a spring device, preferably a compression spring or flat spring.

8. Switching device according to claim 3, characterized in that the basic unit of the switching device is formed by the steering device of the vehicle.

9. Switching device according to claim 1, characterized in that the pantograph device is electrically insulated and is equipped with at least one electrical switching contact with which the vehicle horn can be triggered.

10. Switching device according to claim 1, characterized in that at least one switching contact is attached to the steering device, and its corresponding contact is attached to an airbag unit of the vehicle.

11. Switching device according to claim 1, characterized in that the pantograph device is embodied as a single, self-bearing prefabricated structural unit which is added to the steering device or to an airbag unit while the switching device is mounted.

12. Switching device according to claim 1, characterized in that the pantograph device is mounted in the switching device as individual parts in such a way that its stability is formed by the steering device or an airbag unit.

13. A steering wheel for a vehicle with a horn comprising an actuation element that triggers the vehicle horn when pressing force is applied to the actuation element by an operator, characterized in that the actuation element is mounted on a pantograph device such that the actuation element can move exclusively in a direction that is predetermined by the pantograph device.

14. The steering wheel according to claim 13, wherein the pantograph device stabilizes the pressing force exerted by the operator onto the actuation element in order to trigger the vehicle horn.

15. The steering wheel according the claim 13, wherein the pantograph device can be fastened to the actuation element side in one-touch manner by utilizing a clip.

16. The steering wheel according to claim 15, wherein the clip is coupled to the pantograph device, the clip is provided substantially in an end region of the pantograph element, the pantograph element connects the actuation element with a steering wheel body by means of a bearing.

17. The steering wheel according to claim 16, wherein at least any one of the clip and the bearing is made of resin.

18. The steering wheel according to claim 13, wherein the pantograph device is disposed between a carrier plate and a cover plate, the carrier plate is provided to be coupled to the steering wheel, the cover plate opposes the carrier plate and is coupled to the actuation element, the cover plate is usually located away from the carrier plate by a predetermined distance by means of a guide element and the cover plate is allowed to close to the carrier plate by means of pressing force applied to the actuation element while being guided by the guide element.

19. The steering wheel according to claim 18, wherein the pantograph device can be fastened to at least one of the carrier plate and the cover plate by utilizing a clip in one-touched manner.

20. The steering wheel according to claim 18, wherein an airbag module with an inflator, an airbag and a cover cap is mounted on the cover plate.

21. The steering wheel according to claim 18, wherein the pantograph device comprises the guide element.

22. The steering wheel according to claim 18, wherein the guide element is provided separately from the pantograph element.

23. The steering wheel according to claim 18, wherein the actuation element, the cover plate, the pantograph device and the carrier plate are pre-assembled so as to form a preassembled body to be mounted to the steering wheel.

24. The steering wheel according the claim 23, wherein the preassembled body is detachably mounted to the steering wheel.

25. The steering wheel according to claim 18, wherein a switching device is provided to activate the vehicle horn, the switching device is turned on when the cover plate closes to the carrier plate while being guided by the guide element.

\* \* \* \* \*